US010648388B2

(12) United States Patent
Takeuchi et al.

(10) Patent No.: US 10,648,388 B2
(45) Date of Patent: May 12, 2020

(54) METHOD FOR CONTROLLING AN INTERNAL COMBUSTION ENGINE HAVING AN EXHAUST SYSTEM COMPONENT INCLUDING A SELF-HEALING CERAMIC MATERIAL

(71) Applicant: TOYOTA JIDOSHA KABUSHIKI KAISHA, Toyota-shi, Aichi (JP)

(72) Inventors: Naoki Takeuchi, Susono (JP); Noriaki Kumagai, Susono (JP); Go Hayashita, Ebina (JP); Masakazu Tabata, Susono (JP); Hirokazu Ito, Susono (JP); Kazuhiro Sugimoto, Susono (JP); Hiroki Murata, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/915,329

(22) PCT Filed: Aug. 20, 2014

(86) PCT No.: PCT/JP2014/004267
§ 371 (c)(1),
(2) Date: Feb. 29, 2016

(87) PCT Pub. No.: WO2015/033526
PCT Pub. Date: Mar. 12, 2015

(65) Prior Publication Data
US 2016/0215670 A1    Jul. 28, 2016

(30) Foreign Application Priority Data
Sep. 6, 2013    (JP) .................................. 2013-184826

(51) Int. Cl.
*F01N 3/28*    (2006.01)
*G01N 27/407*    (2006.01)
(Continued)

(52) U.S. Cl.
CPC ......... *F01N 3/2828* (2013.01); *F01N 3/2026* (2013.01); *F01N 3/2825* (2013.01);
(Continued)

(58) Field of Classification Search
CPC ...... F01N 13/16; F01N 3/2026; F01N 3/2825; F01N 3/2828; F01N 2240/16;
(Continued)

(56) References Cited

U.S. PATENT DOCUMENTS 4,429,003 A * 1/1984 Fredriksson .......... C04B 35/565
                                                    428/317.9
5,016,437 A * 5/1991 Huether .................. F01D 25/32
                                                    60/280
(Continued)

FOREIGN PATENT DOCUMENTS

EP    0811840 A2    12/1997
JP    H02-108805 A    4/1990
(Continued)

OTHER PUBLICATIONS

Ghosh, Self-Healing Materials: Fundamentals, Design Strategies, and Applications, Published Nov. 2008, pp. 20-21 (Year: 2008).*

*Primary Examiner* — Matthew T Largi
(74) *Attorney, Agent, or Firm* — Hunton Andrews Kurth LLP (57) ABSTRACT

An object of the present invention is to provide an exhaust system component having excellent properties to be located in an exhaust flow path from an internal combustion engine, particularly, an exhaust system component having an extended use-life. The exhaust system component of the present invention for an internal combustion engine has a self-healing ceramic material and an electric heater for heating the self-healing ceramic material. In particular, the exhaust system component of the present invention is an
(Continued)

oxygen sensor having a detection element and an electric heater, wherein the detection element has a solid electrolyte layer, a reference-side electrode layer, an exhaust-side electrode layer, and a diffusion layer and/or a trap layer each composed of a self-healing ceramic material.

5 Claims, 6 Drawing Sheets

(51) Int. Cl.
  *F01N 3/20* (2006.01)
  *F01N 13/16* (2010.01)
(52) U.S. Cl.
  CPC .......... *F01N 13/16* (2013.01); *G01N 27/4072* (2013.01); *G01N 27/4077* (2013.01); *F01N 2240/16* (2013.01); *F01N 2330/06* (2013.01); *F01N 2560/025* (2013.01); *Y02T 10/26* (2013.01)
(58) Field of Classification Search
  CPC .......... F01N 2330/06; F01N 2560/025; G01N 27/4072; G01N 27/4077
  See application file for complete search history.

(56) References Cited

U.S. PATENT DOCUMENTS

| | | |
|---|---|---|
| 5,766,434 A | 6/1998 | Fujii et al. |
| 6,291,058 B1 * | 9/2001 | Goujard ................ C04B 35/565 428/293.4 |
| 6,912,848 B2 * | 7/2005 | Bedapudi ................ F01N 3/027 180/65.27 |
| 2004/0055262 A1 * | 3/2004 | Zettel .................... B01D 25/001 55/282.3 |
| 2004/0176246 A1 * | 9/2004 | Shirk ..................... B01D 53/94 502/439 |
| 2010/0293921 A1 * | 11/2010 | Yamato .............. B01D 53/9445 60/273 |
| 2010/0300053 A1 | 12/2010 | Alary |
| 2011/0250382 A1 | 10/2011 | Ido et al. |
| 2012/0301691 A1 * | 11/2012 | Charleux ................ C04B 35/52 428/213 |

FOREIGN PATENT DOCUMENTS

| | | |
|---|---|---|
| JP | H10-291853 A | 11/1998 |
| JP | 2007-248392 A | 9/2007 |
| JP | 2009-067659 A | 4/2009 |
| JP | 2012-148963 A | 8/2012 |

* cited by examiner

METHOD FOR CONTROLLING AN INTERNAL COMBUSTION ENGINE HAVING AN EXHAUST SYSTEM COMPONENT INCLUDING A SELF-HEALING CERAMIC MATERIAL

CROSS-REFERENCE TO RELATED APPLICATIONS

This is a national phase application based on the PCT International Patent Application No. PCT/JP2014/004267 filed Aug. 20, 2014, claiming priority to Japanese Patent Application No. 2013-184826 filed Sep. 6, 2013, the entire contents of both of which are incorporated herein by reference.

TECHNICAL FIELD

The present invention relates to an exhaust system component for an internal combustion engine, and an internal combustion engine equipped with the component. More specifically, the present invention relates to an oxygen sensor and an electrically heated catalyst, which are used in the exhaust system for an internal combustion engine, and an internal combustion engine equipped with the component.

BACKGROUND ART

In recent years, a material having a self-healing capability to spontaneously repair the damage generated during use is being developed. Such a material exhibits a remarkably high mechanical reliability and a long use-life, and therefore, is promising as next-generation structural and mechanical materials.

The self-healing function is a phenomenon caused by a chemical reaction, and the self-healing material is in the form of a composite material where a reactant for achieving healing by a chemical reaction (hereinafter, sometimes referred to as "healing-developing material") is encapsulated in a matrix.

Specifically, a self-healing ceramic material utilizing high-temperature oxidation of a healing-developing material has been proposed (PTLs 1 to 3). In particular, as such a self-healing ceramic material, there has been proposed a particle-dispersed self-healing ceramic material where particles of an oxidizable healing-developing material such as silicon carbide are dispersed and compounded in a ceramic matrix. The healing-developing material is oxidized and expands to fill the crack, and thereby achieves self-healing, when cracking occurs in the ceramic matrix (PTL 3).

This self-healing ceramic material can overcome a major problem of the ceramic material, i.e. a problem of being low in the toughness, and thus susceptible to cracking, despite high heat resistance. For this reason, it is considered to use the self-healing ceramic material in the application requiring both heat resistance and mechanical strength, for example, applications such as gas turbine member, jet engine member, automotive engine member and ceramic spring member (PTL 1).

Incidentally, in an internal combustion engine such as automotive engine, a ceramic component is used in various parts, and many ceramic components are used not only for an engine member requiring both heat resistance and mechanical strength as described above, but also for an exhaust flow path from the internal combustion engine.

CITATION LIST

Patent Literature

PTL 1: JP2012-148963
PTL 2: JP-H10-291853
PTL 3: JP2009-67659

SUMMARY OF INVENTION

Problems to be Solved by the Invention

An object of the present invention is to provide an exhaust system component having excellent properties for locating in an exhaust flow path from an internal combustion engine, and particularly an exhaust system component having an extended use-life.

Means to Solve the Problems

As a result of intensive studies, the present inventors have reached the present invention described below.

<1> An exhaust system component for an internal combustion engine, comprising:
a self-healing ceramic material, and
an electric heater for heating the self-healing ceramic material.

<2> The exhaust system component according to item <1> above, wherein electric current flow and/or gas diffusion takes place through the self-healing ceramic material.

<3> The exhaust system component according to item <2> above, which is an oxygen sensor having the following configuration:
(a) an oxygen-conducting solid electrolyte layer,
(b) a reference-side electrode layer disposed on the reference-side surface of the solid electrolyte layer,
(c) an exhaust-side electrode layer disposed on the exhaust-side surface of the solid electrolyte layer,
(d) a diffusion layer and/or a trap layer, disposed on the exhaust-side electrode layer to allow for diffusion and flowing of the exhaust and composed of the self-healing ceramic material, and
(e) the electric heater disposed on the reference side of the solid electrolyte layer.

<4> The exhaust system component according to item <3> above, wherein the diffusion layer and/or trap layer composed of the self-healing ceramic material is heated by the electric heater to a temperature of 550 Celsius degree or more.

<5> The exhaust system component according to item <3> or <4> above, wherein:
the oxygen sensor is a cup-type oxygen sensor having the solid electrolyte layer in a cylindrical shape, and
the diffusion layer and/or trap layer composed of the self-healing ceramic material is disposed on at least the exhaust-flow upstream side of the exhaust-side electrode layer.

<6> The exhaust system component according to any one of items <3> to <5> above, wherein:
the oxygen sensor is a cup-type oxygen sensor having the solid electrolyte layer in a cylindrical shape, and
the electric heater is disposed eccentrically to the exhaust-flow upstream side inside of the cylindrical solid electrolyte layer.

<7> The exhaust system component according to item <2> above, which is an electrically heated catalyst having the following configuration:

(a) an electrically conductive catalyst-supporting substrate having a binding material composed of the self-healing ceramic material and electrically conductive particles bound to each other by the binding material, and (b) the electric heater that is an electrode put into contact with the catalyst-supporting substrate to flow an electric current to the catalyst-supporting substrate.

<8> The exhaust system component according to item <7> above, wherein the catalyst-supporting substrate is a honeycomb substrate.

<9> The exhaust system component according to <7> or <8> above, wherein the self-healing ceramic material has a ceramic matrix, and fine metal and/or semimetal carbide particles having a particle diameter of 1 um (micrometer) or less and being dispersed in the ceramic material, and the electrically conductive particles have a particle diameter of 5 um or more.

<10> The exhaust system component according to any one of items <7> to <9> above, wherein the electrically conductive particles are a silicon carbide particles.

<11> The exhaust system component according to any one of items <1> to <10> above, wherein the self-healing ceramic material has a ceramic matrix and fine metal and/or semimetal carbide particles dispersed in the ceramic matrix.

<12> The exhaust system component according to item <11> above, wherein the ceramic matrix is selected from the group consisting of alumina, mullite, titanium oxide, zirconium oxide, silicon nitride, silicon carbide, aluminum nitride, and a combination thereof.

<13> The exhaust system component according to item <11> or <12> above, wherein the fine metal or semimetal carbide particles are selected from the group consisting of particles of titanium carbide, silicon carbide, vanadium carbide, niobium carbide, boron carbide, tantalum carbide, tungsten carbide, hafnium carbide, chromium carbide, zirconium carbide, and a combination thereof.

<14> The exhaust system component according to any one of items <11> to <13> above, wherein the fine metal or semimetal carbide particles are contained in a ratio of 1 to 50 mass % based on the ceramic matrix.

<15> An internal combustion engine having the exhaust system component according to any one of items <1> to <14> above and a combustion chamber.

<16> A method for controlling the internal combustion engine according to <15> above, comprising heating the self-healing ceramic material by the electric heater when combustion is not performed in the combustion chamber.

<17> The method according to item <15> above, wherein:

the internal combustion engine further has an electric motor, and the self-healing ceramic material is heated by the electric heater, when the electric motor works and combustion is not performed in the combustion chamber.

<18> A method for using the exhaust system component according to any one of items <1> to <14> above, comprising conducting electric current through the self-healing ceramic material to evaluate the electrical conductivity of the self-healing ceramic material.

<19> A method for using the exhaust system component according to any one of items <1> to <14> above, comprising heating the self-healing ceramic material by the electric heater to a temperature of 550 Celsius degree or more.

Effects of the Invention

The exhaust system component of the present invention to be located in an exhaust flow path from an internal combustion engine can have excellent properties, particularly, an extended use-life.

MODE FOR CARRYING OUT THE INVENTION

<<Exhaust System Component>>

The exhaust system component of the present invention for an internal combustion engine, i.e the component of the present invention to be located in an exhaust flow path from an internal combustion engine, has a self-healing ceramic material and an electric heater for heating the self-healing ceramic material.

In the self-healing ceramic material, self-healing occurs by utilizing high-temperature oxidation of a healing-developing material. However, in the exhaust system of an internal combustion engine, a high-temperature oxidation condition is not necessarily obtained. For example, when combustion is being performed in the combustion chamber, a relatively high-temperature condition may be obtained in the exhaust system, but a sufficiently oxidizing atmosphere may not be obtained. Whereas, for example, when the vehicle slows down and combustion is not performed in the combustion chamber, the exhaust system becomes an oxidizing atmosphere, but a sufficiently high temperature condition may not be obtained.

On the other hand, the exhaust system component of the present invention for an internal combustion engine, i.e. the component of the present invention to be located in an exhaust flow path from an internal combustion engine, has a self-healing ceramic material and an electric heater for heating the self-healing ceramic material. Due to this configuration, when the exhaust system is in an oxidizing atmosphere, the self-healing ceramic material is put into a high-temperature oxidizing condition by heating the self-healing ceramic material by means of the electric heater. Accordingly, self-healing utilizing high-temperature oxidation of a healing-developing material can be generated in the exhaust system component of an internal combustion engine.

Also, the self-healing ceramic material has conventionally attracted attention, among others, for its mechanical strength improved compared with a normal ceramic material. Therefore, it has been considered to use the self-healing ceramic material in the application requiring both heat resistance and mechanical strength, for example, applications such as gas turbine member, jet engine member, automotive engine member and ceramic spring member.

In the present invention, it has been found that when the self-healing ceramic material is self-healed by using an electric heater, an unexpected preferable effect such as extended use-life is obtained also in an exhaust system component which has been considered in general to require no large mechanical strength.

Specifically, for example, in an embodiment of the exhaust system component of the present invention, when electric current flow and/or gas diffusion takes place through the self-healing ceramic material, the self-healing ceramic material is self-healed upon occurrence of cracking therein and the crack is filled in the course of self-healing, whereby the change in resistance to electric current flow and/or gas diffusion due to the crack in the self-healing ceramic material can be at least partially recovered. That is, in such an embodiment, properties close to initial properties can be maintained over a long period of time by filling a crack in the course of self-healing of the self-healing ceramic material, i.e. by filling a void in which a gas has been present.

The degree of self-healing and the magnitude of resistance to electric current flow are correlated to a certain extent and therefore, for example, the degree of cracking and/or self-healing of the self-healing ceramic material can be estimated by conducting electric current through the self-healing ceramic material and evaluating the electrical conductivity of the self-healing ceramic material.

Incidentally, self-healing by the self-healing ceramic material is brought about by crack filling resulting from oxidation and expansion of an oxidizable healing-developing material such as silicon carbide. The oxide thus produced, for example silicon oxide when the healing-developing material is silicon carbide, is considered to be an insulating material in general.

However, the oxide produced by the self-healing action is not a pure oxide, but is at least partially oxycarbide and the like. Therefore, the oxide produced by the self-healing action can be a significantly good electrically conductive material, compared with air or the like filling the cracked portion of the self-healing ceramic material.

<Self-Healing Ceramic Material>

As regards the present invention, the self-healing ceramic material may be a composite material having a ceramic matrix and fine metal and/or semimetal carbide particles dispersed in the ceramic matrix.

The particle diameter of the fine particles may be 1 um or less, 700 nm or less, or 500 nm or less. Also, the particle diameter of the fine particles may be 10 nm or more, 50 nm or more, or 100 nm or more. When the particle diameter of the fine particles is relatively small, the development of self-healing due to oxidation of the fine particles can be facilitated.

Here, in the present invention, the particle diameter can be determined as the number average primary particle diameter by directly measuring the projected area equivalent-circle particle diameter based on an image photographed by observation with a scanning electron microscope (SEM), a transmission electron microscope (TEM) or the like and analyzing particles groups each having an aggregation number of 100 or more.

The ceramic matrix may be, for example, a material selected from the group consisting of alumina, mullite, titanium oxide, zirconium oxide, silicon nitride, silicon carbide, aluminum nitride, and a combination thereof.

The fine metal or semimetal carbide particles may be, for example, a material selected from the group consisting of titanium carbide, silicon carbide, vanadium carbide, niobium carbide, boron carbide, tantalum carbide, tungsten carbide, hafnium carbide, chromium carbide, zirconium carbide, and a combination thereof.

The fine particles may be contained in a ratio of 1 mass % or more, 5 mass % or more, or 10 mass % or more, based on the ceramic matrix. Also, the ratio may be 70 mass % or less, 50 mass % or less, or 30 mass % or less.

<Electric Heater>

As regards the present invention, the electric heater for heating the self-healing ceramic material may be, for example, an electric heater for heating the self-healing ceramic material to a temperature of 300 Celsius degree or more, 350 Celsius degree or more, 400 Celsius degree or more, 450 Celsius degree or more, 500 Celsius degree or more, 550 Celsius degree or more, 600 Celsius degree or more, 650 Celsius degree or more, 700 Celsius degree or more, 750 Celsius degree or more, 800 Celsius degree or more, 850 Celsius degree or more, 900 Celsius degree or more, 950 Celsius degree or more, or 1,000 Celsius degree or more. Also, the heating temperature may be 1,500 Celsius degree or less, 1,400 Celsius degree or less, 1,300 Celsius degree or less, 1,200 Celsius degree or less, or 1,100 Celsius degree or less.

As regards the present invention, the electric heater may be an electric heater that is itself heated by resistance heating and transfers the heat to the self-healing ceramic material, or a heating electrode that directly heats the self-healing ceramic material or a material containing the same by resistance heating.

<<Oxygen Sensor>>

The exhaust system component of the present invention in one embodiment is an oxygen sensor. Here, the oxygen sensor is a sensor for inducing an electromotive force by a difference between the exhaust oxygen concentration and the oxygen concentration in a stable reference atmosphere such as air and thereby estimating the exhaust oxygen concentration. Accordingly, as regards the present invention, the "oxygen sensor" encompasses not only a fundamental oxygen sensor where an oxygen ion is conducted as described below through an oxygen-conducting solid electrolyte layer from the reference side having a high oxygen concentration to the exhaust side having a low oxygen concentration, but also a so-called air-fuel ratio sensor that is an oxygen sensor where a bias voltage is applied to electrodes disposed on both sides of a solid electrolyte layer to freely conduct oxygen ions in opposite directions and thereby enable accurate estimation of the oxygen concentration.

The oxygen sensor of the present invention has the following configuration:

(a) an oxygen-conducting solid electrolyte layer, (b) a reference-side electrode layer disposed on the reference-side surface of the solid electrolyte layer, (c) an exhaust-side electrode layer disposed on the exhaust-side surface of the solid electrolyte layer, (d) a diffusion layer and/or a trap layer, disposed on the exhaust-side electrode layer to allow for diffusion and flowing of the exhaust and composed of the self-healing ceramic material, and (e) an electric heater disposed on the reference side of the solid electrolyte layer.

Figure 1:
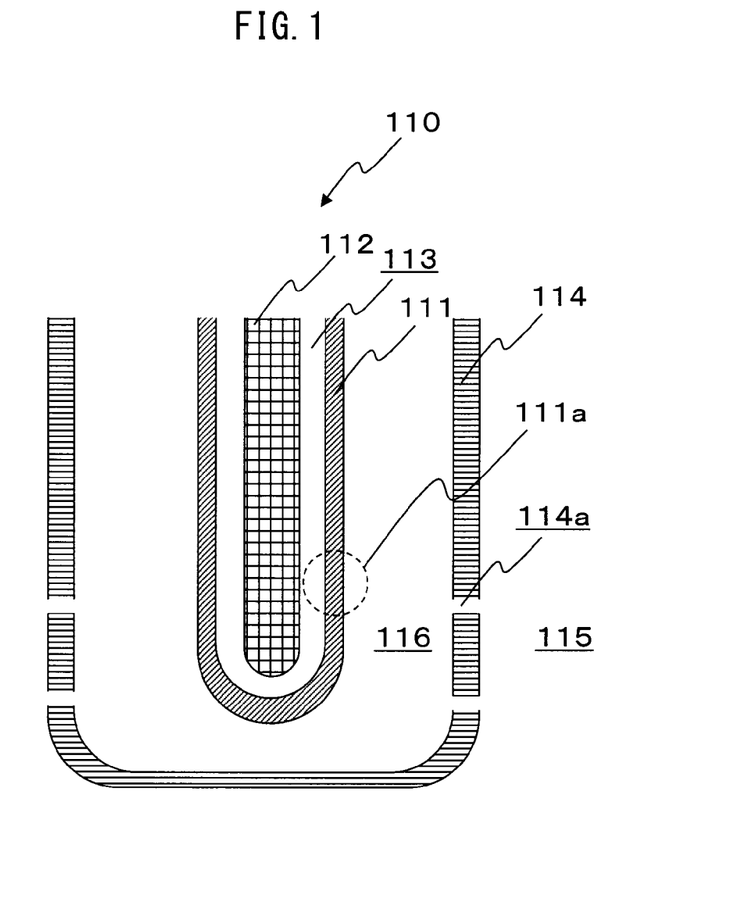
FIG. 1 is a cross-sectional view illustrating one embodiment of the cup-type oxygen sensor of the present invention.

The oxygen sensor may be, for example, a cup-type oxygen sensor (110) shown in FIG. 1. In this cup-type oxygen sensor (110), a solid electrolyte layer, an electrode layer, and a diffusion layer and/or a trap layer make up a cylindrical detection element (111) closed at an end, and an electric heater (112) is disposed in the cylindrical detection element. Also, a reference atmosphere room (113) into which a reference atmosphere having a stable oxygen concentration, such as atmospheric air, is introduced, is present between the cylindrical detection element (111) and the electric heater (112) inside thereof.

In addition, a case (114) made of a metal such as stainless steel may be optionally present outside of the cylindrical part (111). Here, the case (114) has an opening (114a) enabling airflow between the outside (115) and the inside (116) of the case.

Figure 2:
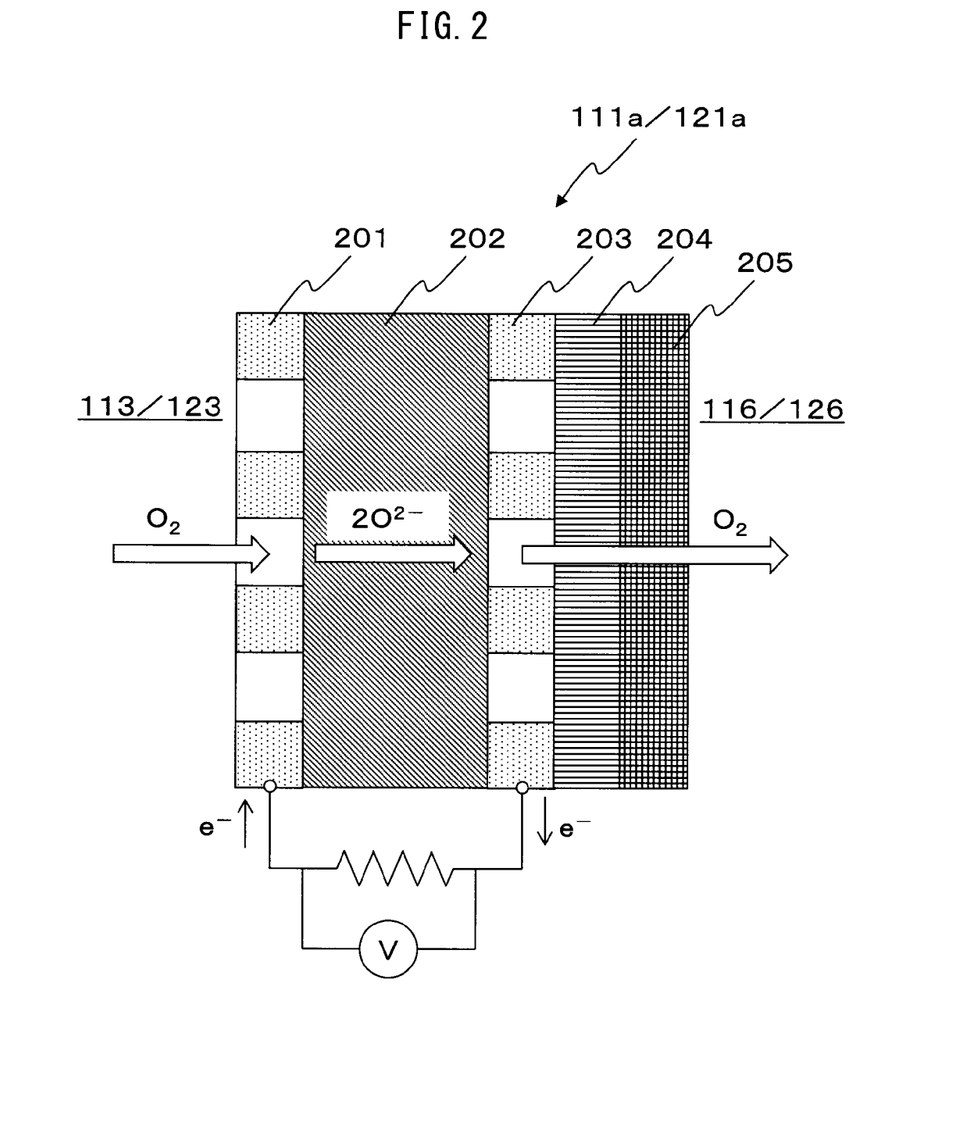
FIG. 2 is a partially enlarged cross-sectional view of a detection element of the cup-type oxygen sensor of FIG. 1 (and a detection element of the planar oxygen sensor of FIG. 3).

The detection element (111) may have, as in FIG. 2 showing a part (111a) thereof in an enlarged manner, a reference-side electrode layer (201), a solid electrolyte layer (202), an exhaust-side electrode layer (203), a diffusion layer (204), and a trap layer (205).

In using the detection element shown in FIG. 2, due to a difference between the oxygen concentration of the reference atmosphere (113) such as air and the oxygen concentration of the exhaust (116), oxygen ($O_2$) receives an electron ($e^-$) and becomes an oxygen ion ($2O^-$) on one electrode (201) side, the oxygen ion ($2O^-$) moves through the solid electrolyte (202), and then, the oxygen ion ($2O^-$) releases the electron ($e^-$) and returns again to oxygen ($O_2$) on the other electrode (203) side. Along with the movement of oxygen ion ($O^-$) from one electrode (201) side to the other electrode (203) side due to the difference in oxygen concentration, the electron ($e^-$) moves in the opposite side and therefore, the difference in oxygen concentration can be evaluated as the electromotive force between electrodes.

Figure 3:
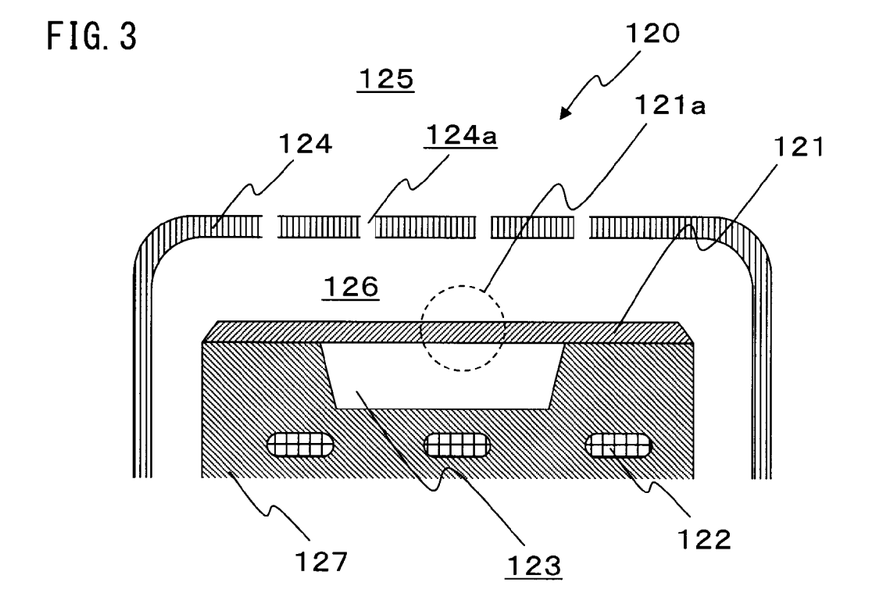
FIG. 3 is a cross-sectional view illustrating one embodiment of the planar oxygen sensor of the present invention.

Incidentally, the oxygen sensor of the present invention may be, for example, a planar oxygen sensor (120) shown in FIG. 3. In the planar oxygen sensor (120), a solid electrolyte layer, an electrode layer, and a diffusion layer and/or a trap layer make up a planar detection element (121), and a reference atmosphere room (123) is formed between the planar detection element (121) and an insulating block (127). Also, an electric heater (122) is disposed in the insulating block (127). Into the reference atmosphere room (123), a reference atmosphere having a stable oxygen concentration, such as atmospheric air, is introduced.

In addition, a case (124) made of a metal such as stainless steel may be optionally present outside of the planar detection element (121). Here, the case (124) has an opening (124a) enabling airflow between the outside (125) and the inside (126) of the case.

The detection element (121) may have a configuration employed in FIG. 2 showing a part (121a) thereof in an enlarged manner. Details and use method of the detection element shown in FIG. 2 are as described above.

(Electrode Layer)

The reference-side electrode layer (201) and the exhaust-side electrode layer (203) may be formed of an arbitrary metal, among others, platinum, and may be formed in a shape capable of at least partially exposing the solid electrolyte layer (202) to the reference atmosphere and the exhaust atmosphere, for example, in a mesh-like shape or a shape having an opening.

<Solid Electrolyte Layer>

The oxygen-conducting solid electrolyte layer (202) may be formed of an arbitrary material exhibiting oxygen conductivity, particularly, may be formed of a partially stabilized zirconia.

<Diffusion Layer and/or Trap Layer>

The diffusion layer (204) allowing the exhaust to diffuse and flow is provided to control the amount of exhaust reaching the solid electrolyte layer, and the trap layer (205) similarly allowing the exhaust to diffuse and flow is provided to prevent liquid water from reaching the solid electrolyte layer (202).

Figure 4:
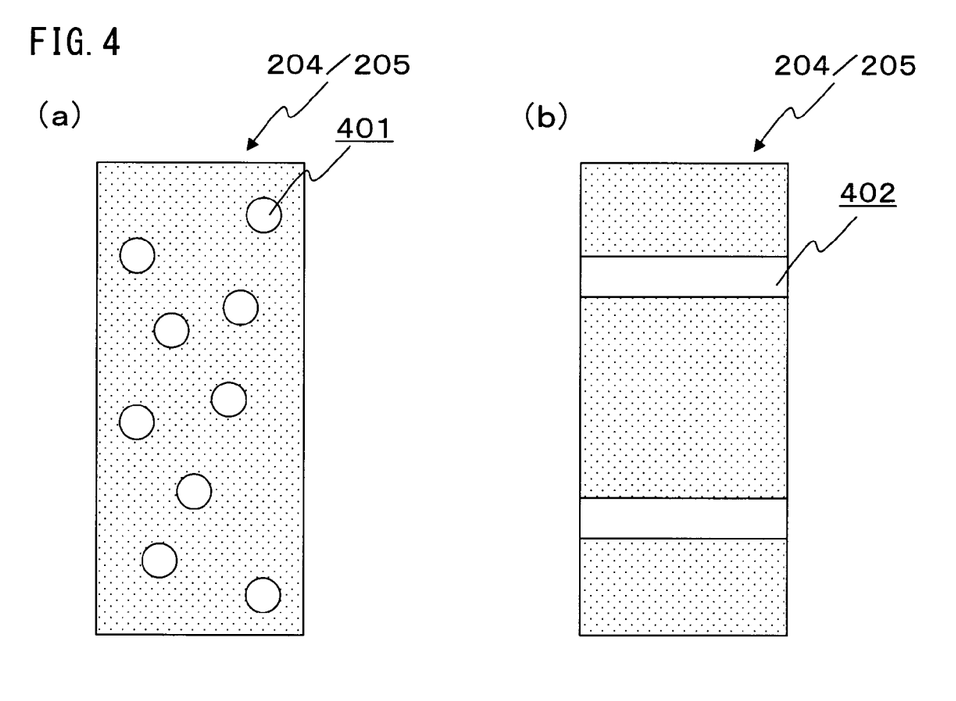
FIG. 4 is a cross-sectional view conceptually illustrating the diffusion layer and/or trap layer of the oxygen sensor of the present invention.

The diffusion layer (204) and/or trap layer (205) each allowing the exhaust to diffuse and flow may be, as shown in FIG. 4(a), a porous layer provided with air permeability by an air hole (401) or may be, as shown in FIG. 4(b), a layer provided with air permeability by a fine through hole (402).

The diffusion layer and/or trap layer are composed of the self-healing ceramic material, whereby even when a crack is generated in the diffusion layer and/or trap layer during use and the diffusion rate is changed, self-healing of the self-healing ceramic material can at least partially recover the change in diffusion rate.

Figure 5:
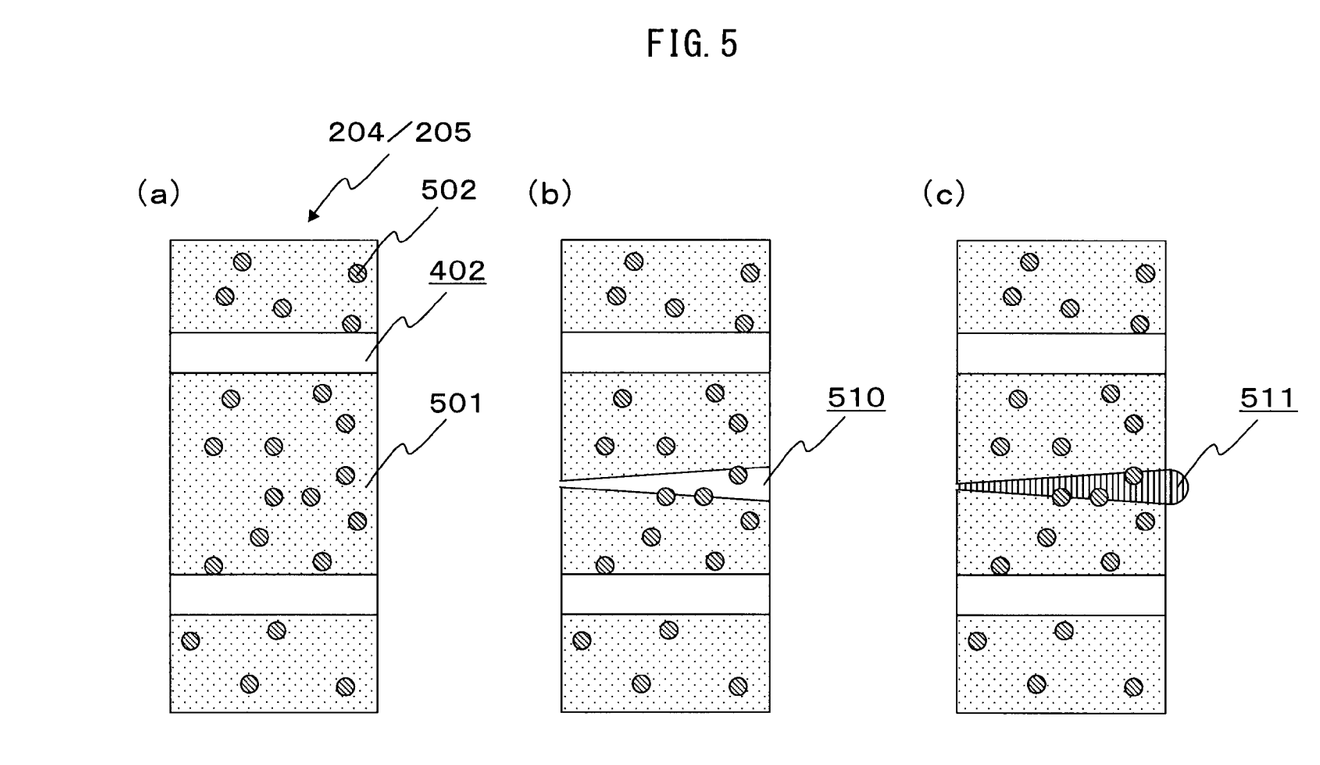
FIG. 5 is a cross-sectional view conceptually illustrating the self-healing effect in the diffusion layer and/or trap layer of the oxygen sensor of the present invention.

For example, when, as shown in FIG. 5, the diffusion layer (204) and/or trap layer (205) are composed of a self-healing ceramic material having a ceramic matrix (501) and fine metal and/or semimetal carbide particles (502) dispersed in the ceramic matrix and at the same time, are provided with air permeability by a fine through hole (402), the above-described effect can be obtained. More specifically, as shown in FIG. 5(a), only diffusion of the exhaust passing through the through hole (402) is initially produced, and even when, as shown in FIG. 5(b), a crack (510) is generated in the diffusion layer and/or trap layer due to thermal shock or the like during use and the diffusion rate is thereby changed, self-healing of the self-healing ceramic material occurs, as shown in FIG. 5(c), to fill up the crack (511), making it possible to at least partially recover the change in diffusion rate.

Incidentally, the oxygen sensor of the present invention may have only either one of the diffusion layer and the trap layer or may have both the diffusion layer and the trap layer. Also, each of the diffusion layer and the trap layer may be formed as one layer. In the case where the oxygen sensor of the present invention has both the diffusion layer and the trap layer, both layers may be composed of the self-healing ceramic material, or while only either one layer is composed of the self-healing ceramic material, the other layer may be composed of other materials such as alumina.

(Electric Heater)

In the case where the exhaust system component of the present invention is an oxygen sensor, the electric heater may be an electric heat capable of heating the diffusion layer and/or trap layer each composed of the self-healing ceramic material to a temperature of 550 Celsius degree or more.

The heating temperature may be 600 Celsius degree or more, 650 Celsius degree or more, 700 Celsius degree or more, 750 Celsius degree or more, 800 Celsius degree or more, 850 Celsius degree or more, 900 Celsius degree or more, 950 Celsius degree or more, or 1,000 Celsius degree or more. Also, the heating temperature may be 1,500 Celsius degree or less, 1,400 Celsius degree or less, 1,300 Celsius degree or less, 1,200 Celsius degree or less, or 1,100 Celsius degree or less.

In the case of using an electric heater for the stabilization or the like of measurement accuracy in an oxygen sensor, heating an oxygen-conducting solid electrolyte layer to a temperature of about 500 Celsius degree has been conventionally performed. On the other hand, in the oxygen sensor of the present invention, the electric heater performs heating to a temperature of 550 Celsius degree or more exceeding the temperature above, whereby self-healing capability of the self-healing ceramic material can be promoted. That is, the solid electrolyte layer can be heated to a temperature higher than the temperature necessary for oxygen concentration detection of the oxygen sensor, and at the time of promoting the self-healing capability of the self-healing ceramic material, the solid electrolyte layer is heated to a temperature higher than the temperature at the detection of oxygen concentration of the oxygen sensor.

<<Oxygen Sensor (Cup-Type)>>

In the case where the oxygen sensor as the exhaust system component of the present invention is a cup-type oxygen sensor having a cylindrical solid electrolyte layer, the diffusion layer and/or trap layer each composed of the self-healing ceramic material may be disposed on at least exhaust-flow upstream side of the exhaust-side electrode layer, and particularly only exhaust-flow upstream side of the exhaust-side electrode layer.

The exhaust-flow upstream side of the oxygen sensor has a relatively high tendency to receive a thermal shock due to attachment of water in the exhaust and thereby cause a crack. Accordingly, it is preferred that the diffusion layer and/or trap layer composed of the self-healing ceramic material are disposed on at least exhaust-flow upstream side, because such a crack problem is relieved by the self-healing ceramic material.

Also, in the case where the oxygen sensor as the exhaust system component of the present invention is a cup-type oxygen sensor having a cylindrical solid electrolyte layer, the electric heater may be disposed eccentrically to the exhaust-flow upstream side inside of the cylindrical solid electrolyte layer.

This eccentricity means, for example, that the distance between the electric heater and the cylindrical solid electrolyte layer is narrower on the exhaust-flow upstream side than on the exhaust-flow downstream side. More specifically, for example, the distance between the electric heater and the cylindrical solid electrolyte layer on the exhaust-flow upstream side may be 90% or less, 80% or less, 70% or less, 60% or less, 50% or less, 40% or less, 30% or less, 20% or less, or 10% or less, of the distance on the exhaust-flow downstream side.

As described above, the exhaust-flow upstream side of the oxygen sensor has a relatively high tendency to cause a crack and therefore, disposing the electric heater eccentrically to the exhaust-flow upstream side inside of the cylindrical solid electrolyte layer is preferred so as to preferentially heat the exhaust-flow upstream side of the diffusion layer and/or trap layer composed of the self-healing ceramic material and promote self-healing of this portion.

<<Electrically Heated Catalyst>>

The exhaust system component of the present invention in one embodiment is an electrically heated catalyst. Here, the electrically heated catalyst is a catalyst capable of heating an electrically conductive catalyst-supporting substrate upon electric current flow of the substrate and thereby increasing the exhaust purification effect of a catalyst metal supported on the substrate. Incidentally, as the catalyst metal, an arbitrary catalyst metal for exhaust purification, for example, a noble metal such as platinum and rhodium, or a base metal such as iron and copper, can be used.

The electrically heated catalyst of the present invention has the following configuration:

(a) an electrically conductive catalyst-supporting substrate having a binding material composed of a self-healing ceramic material and electrically conductive particles, such as silicon carbide particle, bound to each other by the binding material, and (b) an electric heater that is an electrode put into contact with the catalyst-supporting substrate to flow an electric current to the catalyst-supporting substrate.

Figure 6:
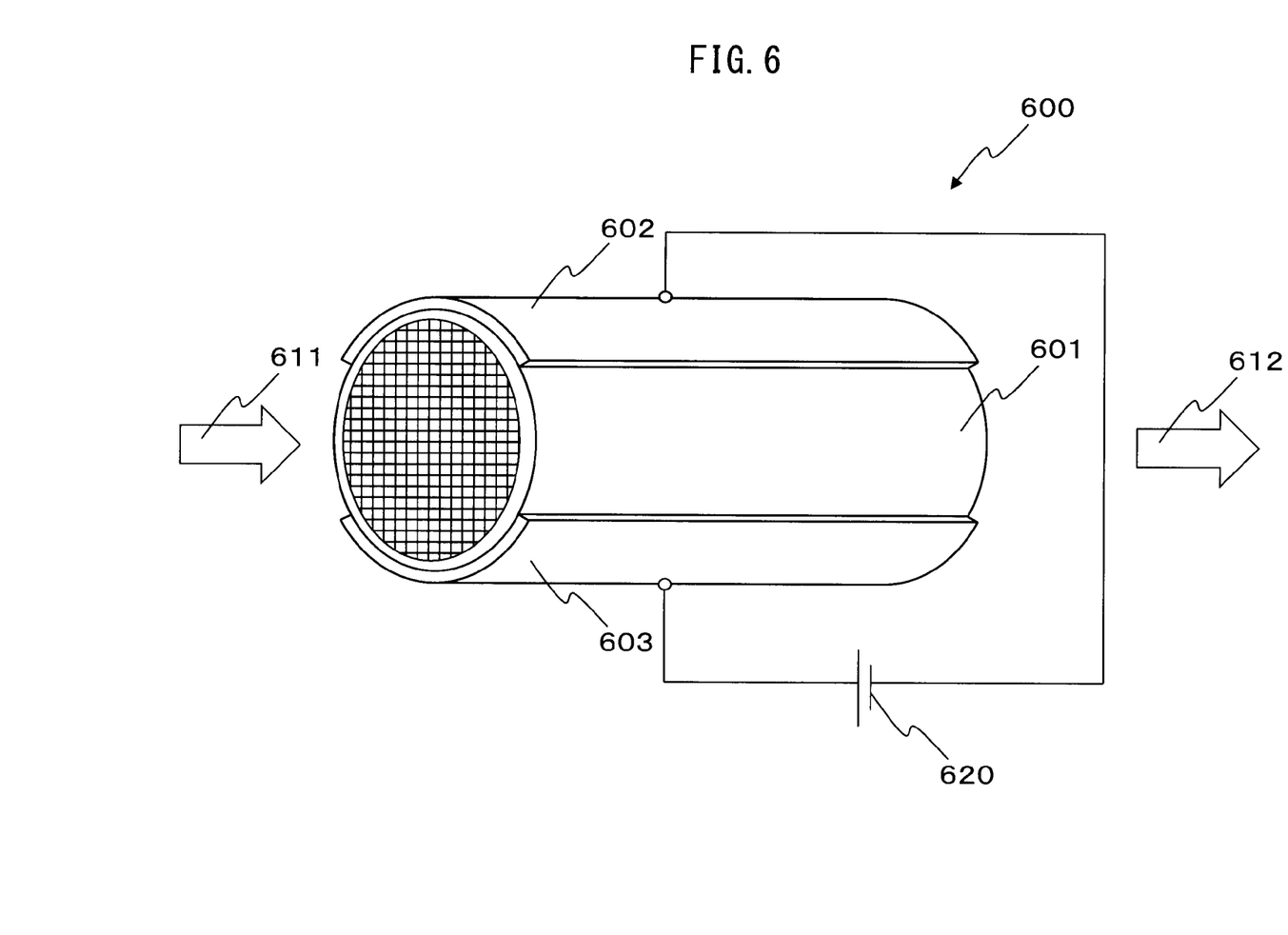
FIG. 6 is a perspective view illustrating one embodiment of the electrically heated catalyst of the present invention.

The electrically heated catalyst may be, for example, as shown in FIG. 6, an electrically heated catalyst (600) where the catalyst-supporting substrate is a honeycomb substrate (601). In this case, electrodes (602, 603) as the electric heater are put into contact with the outer circumferential surface of the honeycomb substrate (601) and can flow an electric current to the honeycomb substrate and thereby heat the honeycomb substrate. Incidentally, the honeycomb substrate may be a so-called straight flow-type honeycomb substrate or a wall flow-type honeycomb substrate.

In using such an electrically heated catalyst, an electric current is flowed to the honeycomb substrate (601) from a power source (620) through the electrodes (602, 603) as electric heaters to thereby heat the honeycomb substrate. Also, after this heating or while carrying out the heating, the exhaust is flowed through the honeycomb substrate as shown by arrows (611, 612), as a result, the exhaust can be purified by the catalyst supported on the honeycomb substrate.

In the electrically heated catalyst of the present invention, the self-healing ceramic material may have a ceramic matrix and fine metal and/or semimetal carbide particles having a particle diameter of 1 um or less and being dispersed in the ceramic matrix, and the electrically conductive particles may have a particle diameter of 5 um or more.

In this connection, the particle diameter of the fine metal and/or semimetal carbide particles may be, for example, 1 um or less, 700 nm or less, or 500 nm or less. Also, the particle diameter of the fine particles may be 10 nm or more, 50 nm or more, or 100 nm or more. In addition, the particle diameter of the electrically conductive particles may be 5 um or more, 10 um or more, 15 um or more, 20 um or more, 25 um or more, 30 um or more, 35 um or more, 40 um or more, 45 um or more, or 50 um or more.

In this way, when the particle diameter of the fine carbide particles constituting the self-healing ceramic material is relatively small and the particle diameter of the electrically conductive particles are relatively large, development of self-healing property by the fine carbide particles constituting the self-healing ceramic material can be facilitated, and the electrically conductive particles can be less likely to be affected by oxidation and the like.

In the electrically heated catalyst of the present invention, the binding material binding electrically conductive particles in the electrically conductive catalyst-supporting substrate is composed of a self-healing ceramic material, so that even when a crack is generated in the catalyst-supporting substrate during use and the electric resistance is changed locally, the local change in electric resistance can be at least partially recovered by self-healing of the self-healing ceramic material.

Figure 7:
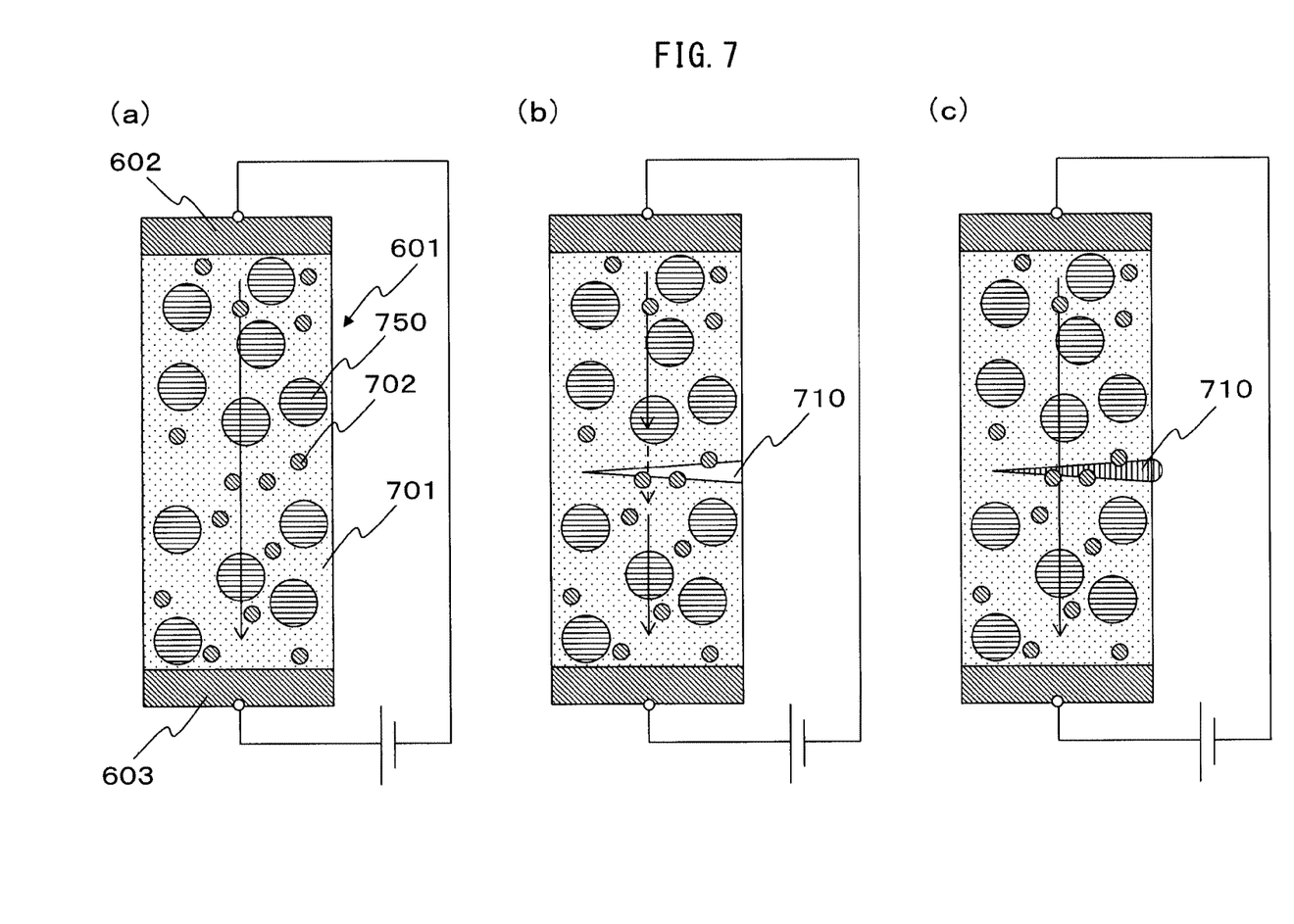
FIG. 7 is a cross-sectional view conceptually illustrating the self-healing effect in the substrate of the electrically heated catalyst of the present invention.

For example, as shown in FIG. 7, the binding material binding electrically conductive particles (750) in the electrically conductive catalyst-supporting substrate (601) has a ceramic matrix (701) and fine metal and/or semimetal carbide particles (702) dispersed in the ceramic matrix, whereby the above-described effect can be obtained. More specifically, as shown in FIG. 7(a), an electric current flows initially as shown by the arrow through the electrically conductive particles and the binder material, and even when, as shown in FIG. 5(b), a crack (710) is generated in the catalyst-supporting substrate (601) due to thermal shock or the like during use and the electrical conductivity is thereby changed locally, self-healing of the self-healing ceramic material occurs, as shown in FIG. 7(c), to fill up the crack (711), making it possible to at least partially recover the local change in electrical conductivity.

<<Internal Combustion Engine and Controlling Method Thereof>>

The internal combustion engine of the present invention has the exhaust system component of the present invention and a combustion chamber. Among others, the internal combustion engine of the present invention may be an automotive engine.

The internal combustion engine of the present invention can be controlled by heating the composite material by means of an electric heater when combustion is not performed in the combustion chamber. The "when combustion is not performed in the combustion chamber" encompasses, for example, when the vehicle is slowed down and the fuel supply to the combustion chamber is stopped, and when so-called fuel cut control is practiced, and in the case where the internal combustion engine is an automatically stoppable/startable combustion engine, encompasses when automatic stopping is implemented. Furthermore, the internal combustion engine of the present invention may further have an electric motor and can be controlled by heating the composite material by means of an electric heater, when the vehicle is driven by the electric motor and combustion is not performed in the combustion chamber.

When combustion is not performed in the combustion chamber, for example, when fuel cut control is practiced, the oxygen concentration of the exhaust flowing in the exhaust system becomes relatively high and therefore, heating of the self-healing ceramic material by the electric heater can promote self-healing of the self-healing ceramic material due to oxidation and expansion of the healing-developing material such as fine carbide particle.

DESCRIPTION OF NUMERICAL REFERENCES

110: Cup-type oxygen sensor
111, 121: Detection element
111a, 121a: A part of detection element
112, 122: Electric heater
113, 123: Reference atmosphere room
114, 124: Metal-made case
114a, 124a: Opening of metal-made case
120: Planar oxygen sensor
127: Insulating block
201: Reference-side electrode layer
202: Solid electrolyte layer
203: Exhaust-side electrode layer
204: Diffusion layer
205: Trap layer
401: Air hole
402: Through hole
501, 701: Ceramic matrix
502, 702: Fine metal and/or semimetal carbide particle
510, 710: Crack
511, 711: Crack filled up by self-healing
601: Honeycomb substrate
600: Electrically heated catalyst
602, 603: Electrode
620: Power source
611, 612: Arrow indicating exhaust flow
750: Electrically conductive particle

The invention claimed is:

1. A method for controlling an internal combustion engine having an exhaust system component and a combustion chamber, wherein the exhaust system component comprises a self-healing ceramic material, and an electric heater for heating the self-healing ceramic material, the method comprises:
determining a change in an electrical conductivity of the self-healing ceramic material;
determining a cracking of the self-healing ceramic material based on the change in the electrical conductivity of the self-healing ceramic material; and
heating the self-healing ceramic material by the electric heater in response to combustion not being performed in the combustion chamber to put the self-healing ceramic material in a high-temperature oxidizing condition;
wherein the self-healing ceramic material comprises fine particles and the fine particles are oxidized under the high-temperature oxidizing condition so as to fill a crack in the self-healing ceramic material,
wherein electric current flow or gas diffusion takes place through the self-healing ceramic material,
wherein the exhaust system component is an electrically heated catalyst having the following configuration:
(a) an electrically conductive catalyst-supporting substrate having a binding material composed of the self-healing ceramic material and electrically conductive particles bound to each other by the binding material, and
(b) the electric heater that is an electrode put into contact with the electrically conductive catalyst-supporting substrate to flow an electric current to the electrically conductive catalyst-supporting substrate, and
wherein the self-healing ceramic material has a ceramic matrix, and fine metal or semimetal carbide particles having a particle diameter of 1 um or less and being dispersed in the ceramic material, and
wherein the electrically conductive particles have a particle diameter of 5 um or more.

2. The method according to claim 1, wherein the electrically conductive catalyst-supporting substrate is a honeycomb substrate.

3. The method according to claim 1, wherein the electrically conductive particles are silicon carbide particles.

4. The method according to claim 1, wherein:
the internal combustion engine further has an electric motor, and
the self-healing ceramic material is heated by the electric heater, when the electric motor works and combustion is not performed in the combustion chamber.

5. The method according to claim 1, wherein the heating of the self-healing ceramic material by the electric heater is to a temperature of 550 degrees Celsius or more.

* * * * *